# United States Patent [19]

Townsend

[11] 4,411,573
[45] Oct. 25, 1983

[54] BALE HANDLING APPARATUS

[76] Inventor: Tod N. Townsend, Box 662, White Sulphur Springs, Mont. 59645

[21] Appl. No.: 287,287

[22] Filed: Jul. 27, 1981

[51] Int. Cl.³ .................................... A01D 87/12
[52] U.S. Cl. ........................... 414/24.6; 241/101.7; 414/704; 414/740; 414/911
[58] Field of Search .............. 414/24.5, 24.6, 684, 414/704, 721, 740, 911; 241/101 A, 101.7

[56] References Cited

U.S. PATENT DOCUMENTS

| | | | |
|---|---|---|---|
| 2,545,473 | 3/1951 | Kremkav | 42/1 N |
| 3,368,811 | 2/1968 | Finney | 42/1 R |
| 3,817,567 | 6/1974 | Lull | 414/740 X |
| 4,025,006 | 5/1977 | Turnbow | 414/911 X |
| 4,044,967 | 8/1977 | Guichon | 414/24.6 |
| 4,083,138 | 4/1978 | Cash | 42/1 R |
| 4,089,425 | 5/1978 | Baltz | 414/721 X |
| 4,176,606 | 12/1979 | King et al. | 42/1 Z |
| 4,266,899 | 5/1981 | Skeem | 414/24.6 |
| 4,268,987 | 5/1981 | Cash | 42/1 R |

FOREIGN PATENT DOCUMENTS

| | | | |
|---|---|---|---|
| 2371868 | 7/1978 | France | 414/24.6 |
| 179788 | 6/1962 | Sweden | 414/721 |
| 804872 | 11/1958 | United Kingdom | 414/721 |
| 640699 | 1/1979 | U.S.S.R. | 414/24.5 |

Primary Examiner—Leslie J. Paperner
Attorney, Agent, or Firm—Arthur L. Urban

[57] ABSTRACT

Bale handling apparatus including a frame portion, a bale moving portion, a bale engaging portion and a control portion; the frame portion including a base section, the base section including a pair of substantially parallel spaced side members; the bale moving portion including rotatable mechanism extending between the side members of the base section, the rotatable mechanism being disposed along the side members of the base section; the bale engaging portion including hook mechanism pivotally connected to the frame portion adjacent one edge thereof, the hook mechanism being oriented substantially parallel to the side members of the base section, the hook mechanism being of a length substantially the same as the side members; the control portion including mechanism for driving the rotatable mechanism, mechanism for pivoting the hook mechanism with respect to the base section and mechanism for changing the position of the base section; whereby when the apparatus is attached to a vehicle, a round bale may be positioned on the apparatus by tilting the base section and grasping the bale between the hook mechanism and the base section, and the bale may be opened and distributed by raising the base section and driving the rotatable mechanism to unroll the bale.

3 Claims, 3 Drawing Figures

BALE HANDLING APPARATUS

This invention relates to a novel bale handling apparatus and more particularly relates to a new apparatus for handling large bales of forage material.

Many years ago, cut hay and other forage crops were gathered into stacks for storage prior to use as animal feed. While this method was satisfactory when farm labor was readily available and cheap, difficulties in obtaining farm laborers and the high cost of such labor have seen the demise of loose haystacks in recent years.

A variety of solutions have been proposed for reducing the amount of labor required for gathering and storing hay. These proposals frequently have involved the mechanical compression of hay into bales of one shape or another. The use of this type of machinery for the baling of hay has resulted in a significant reduction in the hand labor previously required for such operations.

Hay often is baled into rectangular bales having a size about one foot by one and one-half feet by three feet. These bales than are stacked in crossed layers with the bales in one layer having their long dimension at right angles to the long dimension of bales in adjacent layers. Although machinery has been developed to stack rectangular bales, most farmers and ranchers still utilize considerable hand labor with such small bales to achieve the desired tight straight stacking of the bales.

With the continuing increasing difficulties in obtaining and paying for farm labor, there have been further efforts to develop hay handling methods that can achieve additional reductions in the amount of hand labor required for such operations. One proposal that has received a considerable degree of acceptance has been the baling of hay into large round bales. These bales may be as large as six feet or more in diameter and weigh more than 1,000 pounds.

Round bales have a number of significant advantages over conventional small rectangular bales. Round bales can be gathered from the field and stacked easily by one person with a tractor. A tractor can be equipped with a spear-like projection or a fork lift attachment and the bale lifted off the ground and moved to a desired position. Since a half ton or more of hay can be handled in one simple operation, a large quantity of hay can be gathered and stacked in a very short time by a single tractor operator.

While methods such as described above have been developed which greatly reduce the amount of hand labor involved in gathering and storing hay, the subsequent use of and feeding of such hay still often involves considerable hand labor. Usually with small rectangular bales, the bales are removed from the stack individually by hand and transferred to the feeding site in a truck or trailer. At the feeding site, each bale is opened by cutting the twine and the hay distributed over the ground.

In feeding animals from the large round bales, the hay may be distributed from the bale by hand or by one of the presently offered tractor accessories. Feeding by hand involves carrying a bale to the field with a tractor, stopping the tractor periodically and getting off to remove and distribute some of the hay by hand.

The commercially available mechanical round bale feeders ordinarily are mounted on the back of the tractor and require that the bales be handled one at a time. After a bale has been distributed in the field, the driver must return to the hay storage area, pick up another bale and then drive back to the field to resume the distributing operation. This repeated returning to the hay storage area can waste considerable time and fuel.

The present invention provides a novel bale handling apparatus which simplifies the distribution of hay and other forage from large round bales. The bale handling apparatus of the invention provides a convenient means for achieving uniform distribution of hay quickly and with a minimum of time and fuel. The bale handling apparatus permits a single person driving a tractor pulling a trailer to distribute hay from a large number of bales in a short period of time.

The bale handling apparatus of the present invention is simple in design and relatively inexpensive to manufacture. The bale handling apparatus can be fabricated from commercially available materials and components. Conventional farm equipment manufacturing techniques and procedures can be utilized in the fabrication of the apparatus.

The bale handling apparatus is suitable for use with a wide variety of different tractors. The apparatus can be installed on a tractor easily in only a few minutes and can be removed as easily when not needed. The feeding apparatus is durable in construction and has a long useful life with little maintenance.

Other benefits and advantages of the novel bale handling apparatus of the present invention will be apparent from the following description and the accompanying drawings in which.

Figure 1:
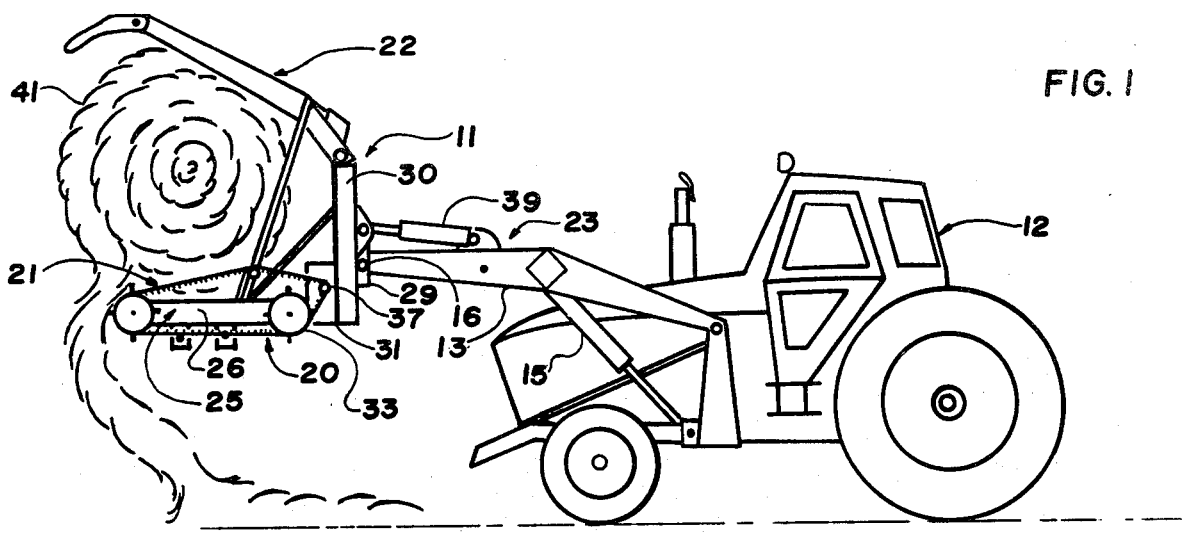
FIG. 1 is a side elevation of one form of the bale handling apparatus mounted on a tractor with the apparatus in a feeding position.
Figure 2:
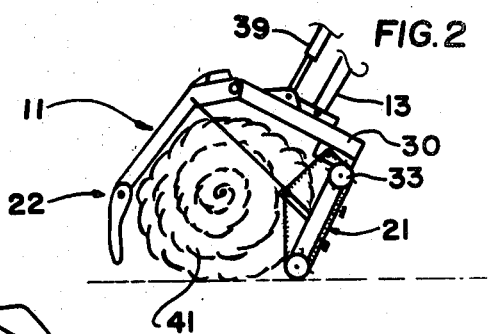
FIG. 2 is a side elevation of the bale handling apparatus shown in FIG. 1 with the apparatus in a loading position.
Figure 3:
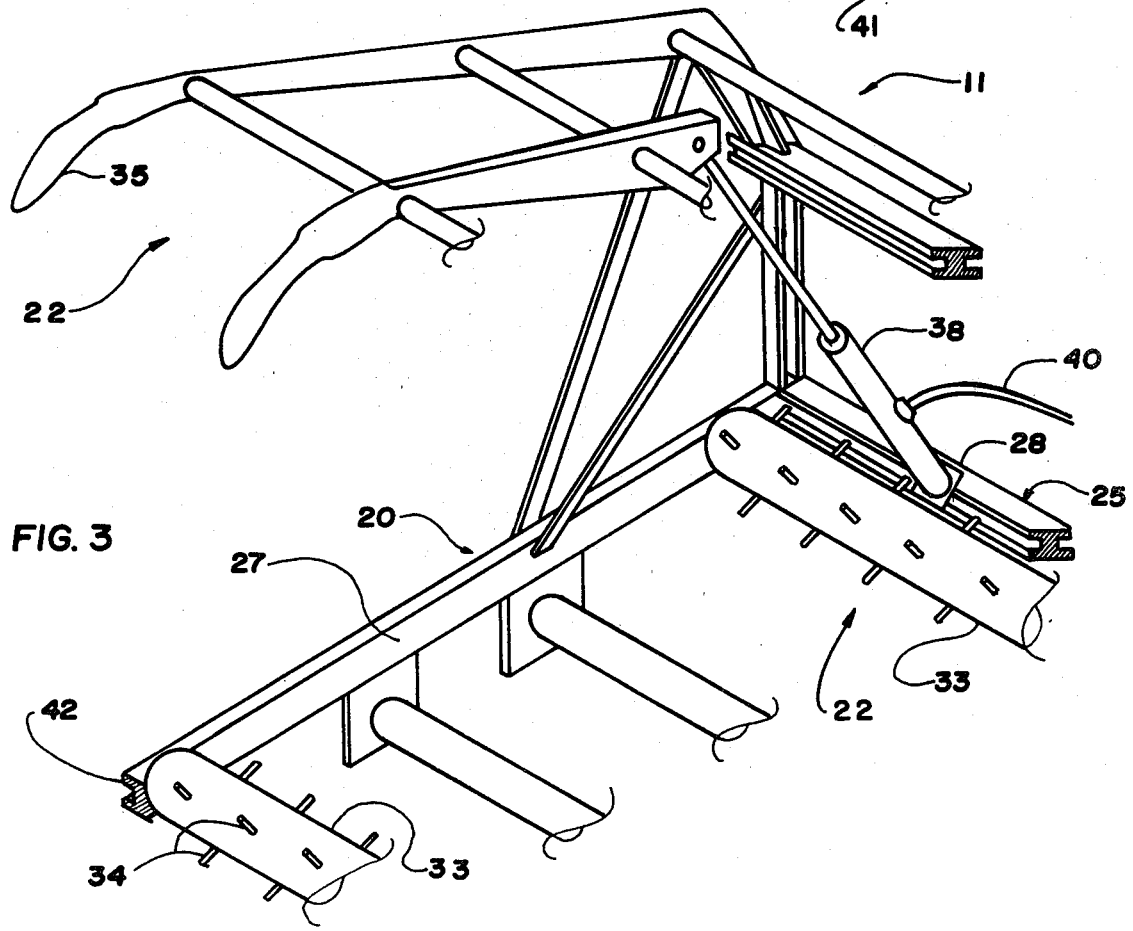
FIG. 3 is a fragmentary view in perspective of the bale handling apparatus shown in FIGS. 1 and 2.

As shown in the drawings, one form of the bale handling apparatus 11 of the invention is mounted on a tractor 12. The apparatus 11 is pivotally connected to the free end of a forward boom 13 of the tractor 12. The boom 13 is actuatable with one or more hydraulic cylinders 15. The apparatus 11 is pivotally connected to the boom 13 with suitable pins, bolts 16 or the like.

The bale handling apparatus 11 includes a frame portion 20, a bale moving portion 21, a bale engaging portion 22 and a control portion 23. The frame portion 20 includes a base section 25. The base section 25 includes a pair of substantially parallel spaced side members 26 and 27. Advantageously, at least one cross member 28 extends between the side members 26 and 27 and connects same.

The frame portion 20 further includes means for pivotally connecting the apparatus 11 to a vehicle such as tractor 12. The connecting means may include a pin and clevis combination 29. Also, the frame portion 20 may include an upstanding section 30 which extends from one edge 31 of the base section 25.

The bale moving portion 21 includes rotatable means extending between the side members 26 and 27 of the base section 25. The rotatable means is disposed along the side members of the base section. The rotatable means may include any of a number of mechanisms to move a bale supported on the apparatus 11. Suitable rotatable means include conveyor belts, chain and sprocket combinations and the like and more advantageously rollers 33 as shown in the drawings.

The rotatable means may include a surface with frictional characteristics and preferably a frictional surface with a plurality of raised portions such as nubs or fingers 34. It is desirable to utilize a plurality of spaced substantially parallel rollers 33 to effect movement of the bale.

The bale engaging portion 22 includes hook means 35 pivotally connected to the frame portion 20 adjacent one edge 31 thereof. The hook means 35 is oriented substantially parallel to the side members 26 and 27 of the base section 25. Hook means 35 is of a length substantially the same as the side members 26 and 27. Advantageously, the hook means 35 includes a plurality of spaced hook members.

The control portion 23 includes means such as hydraulic motor 37 for driving one or more rollers 33. Also, the control means 23 includes means such as hydraulic cylinder 38 for pivoting the hook means 35 with respect to the base section 25. Further, the control means includes means such as a second hydraulic cylinder 39 for changing the position of the base section. Advantageously, the control means includes hydraulic drive means such as motor 37 and cylinders 38 and 39 which can be interconnected with the existing hydraulic system 40 of the tractor 12.

The bale handling apparatus 11 of the present invention may be installed on a vehicle such as tractor 12 shown in the drawings in a manner similar to the way that other machinery is attached to the front of a tractor. The frame portion 20 may be pivotally connected to the forward boom 13 with a pin and clevis arrangement 29. The base section 25 is connected to the end of the boom 13 through the pivotal connection and also through hydraulic cylinder 39. In addition, the motor 37 and the other cylinder 38 are connected to the hydraulic system 40 of the tractor 12.

In the use of the bale handling apparatus 11 of the invention, a tractor operator drives the tractor 12 into position for loading a bale 41. This involves orienting the tractor so forward edge 42 of the base section 25 of the apparatus is adjacent to the bale. By actuating controls of the hydraulic system 40, cylinder 38 raises hooks 35 to increase the spacing between the hooks and the base section 25.

Cylinder 39 then is actuated to tilt the apparatus 11 until the forward edge 42 of the base section 25 is close to the under part of the bale 41. The tractor is moved forward, sliding the base section 25 under the bale while actuating cylinder 38 again to move the hooks 35 closer to the base section 25 and thereby squeeze the bale between the two components.

The apparatus 11 then is raised so that the base section 25 with the bale 41 resting thereon is in a substantially horizontal position. The tractor 12 is driven forward slowly simultaneously with actuation of hydraulic motor 37. Actuation of motor 37 rotates one or more of the rollers 33 which are operatively connected thereto. Since the bale is resting on the rollers 33, rotation of the rollers causes the bale to rotate also. The rotation of the bale causes the hay wound thereon to unroll and be distributed on the ground in a thin layer.

This procedure is continued until all of the hay in the bale has been distributed over the ground behind the tractor. At that time, the tractor can pick up another bale in the same way as the first and the distribution of hay continued. To increase the efficiency of the feeding operation, a number of bales can be loaded on a trailer and the loaded trailer pulled to the feeding site behind the tractor 12 which has the apparatus 11 of the invention mounted on the front thereof. Then, the trailer can be disconnected and each bale fed in sequence. In this way, the feeding can be accomplished without returning to the bale storage area after each bale has been distributed.

The above description and the accompanying drawings show that the present invention provides a novel bale handling apparatus which simplifies the distribution of forage material from large round bales. The bale handling apparatus of the invention enables one person on a tractor or other vehicle to distribute a large number of bales in a short period of time. The apparatus provides a means for distributing hay or other forage material with a minimum of time and fuel.

The bale handling apparatus of the present invention is adaptable for use with a variety of different tractors and other vehicles. The apparatus can be installed on a tractor in only a few minutes and can be removed as easily when the apparatus is not needed.

The bale feeding apparatus is simple in design and relatively inexpensive to manufacture. The apparatus is durable in construction and has a long useful life with little maintenance. The bale feeding apparatus can be fabricated from commercially available materials and components using conventional farm equipment manufacturing techniques and procedures.

It will be apparent that various modifications can be made in the particular bale handling apparatus described in detail and shown in the drawings within the scope of the invention. The size, configuration and arrangement of components can be changed to meet specific requirements. Also, the control portion can be different to facilitate operation of the apparatus with particular vehicles. These and other changes can be made in the bale handling apparatus of the invention provided the functioning and operation of the apparatus is not deleteriously affected. Therefore, the scope of the invention is to be limited only by the following claims.

What is claimed is:

1. Bale handling apparatus including a frame portion, a bale moving portion, a bale engaging portion and a control portion; said frame portion including a base section, said base section including a pair of substantially parallel spaced side members, said frame portion also including means for pivotally connecting said apparatus to a vehicle; said bale moving portion including rotatable means extending between said side members of said base section, said rotatable means being disposed along said side members of said base section, said rotatable means including a plurality of spaced parallel roller means with a plurality of raised portions, the roller means adjacent the free ends of said side members being disposed inside the nip of said bale and the outer layer thereof; said bale engaging portion including a plurality of spaced hook means pivotally connected to said frame portion adjacent one edge thereof, said hook means being oriented substantially parallel to said side members of said base section, said hook means being of a length substantially the same as said side members; said control portion including means for driving said rotatable means, means for pivoting said hook means with respect to said base section and means for changing the position of said base section; whereby when said apparatus is attached to a vehicle, a round bale may be positioned on said apparatus by tilting said base section and grasping said bale between said hook means and said base section, and said bale may be opened and distributed by raising said base section and driving said rotatable means to unroll said bale.

2. Bale handling apparatus according to claim 1 wherein said frame portion includes an upstanding section extending between said base section and said pivotal connection with said hook means.

3. Bale handling apparatus according to claim 1 wherein said control portion includes a plurality of hydraulic drive means.

* * * * *